March 6, 1962

W. M. NYE 3,024,320

DICTATING MACHINE ERASURE UNIT

Filed June 20, 1958

2 Sheets-Sheet 1

INVENTOR.

William M. Nye

BY Albert H. Kirchner

Attorney

March 6, 1962 W. M. NYE 3,024,320

DICTATING MACHINE ERASURE UNIT

Filed June 20, 1958

2 Sheets-Sheet 2

INVENTOR.

William M. Nye

BY

Albert H. Kirchner

Attorney

United States Patent Office 3,024,320
Patented Mar. 6, 1962

3,024,320

DICTATING MACHINE ERASURE UNIT

William M. Nye, 3806 Woodland Park Ave., Seattle 3, Wash., assignor of one-half to James A. Fraser, Bellevue, Wash.

Filed June 20, 1958, Ser. No. 743,339
7 Claims. (Cl. 179—100.2)

This invention relates to a device for recording and reproducing dictated messages of the general type disclosed in my copending application Serial No. 424,330, filed April 20, 1954, of which the instant application is a continuation-in-part. More particularly the present application is concerned with a novel message erasure means associated with the endless recording tape employed with the apparatus of the aforementioned application.

In the operation of sound recording and reproducing equipment employing endless tapes, such as that shown and described in application Serial No. 424,330, somewhat complex mechanisms have been utilized for erasing messages previously dictated and reproduced prior to reusing the tape. The instant invention is concerned with a simple, foolproof type of erasure means which can readily be incorporated in any tape recording device and in particular any using an endless recording tape.

Accordingly it is a primary object of this invention to provide a novel erasure element or unit for recording tapes used in instruments for recording and reproducing dictated messages and the like.

It is a further object of this invention to provide a novel erasure device which will operate completely independently of the operator of an intelligence recording and reproducing apparatus.

It is another object of this invention to provide a unique erasure unit which is slidably mounted on an endless tape used in devices for recording and reproducing dictated messages, wherein the erasure unit is supported solely by the tape.

Other objects and advantages of the invention will become more apparent from a review of the following detailed description, when taken in conjunction with the appended drawings, wherein.

Figure 3:
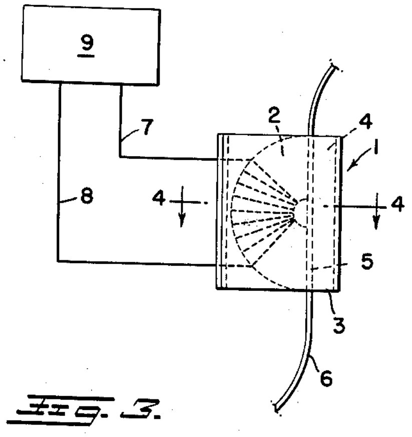
FIG. 3 is a side elevational view of the message erasure unit of the invention, showing the manner in which it is slidably attached to an endless tape.
Figure 4:
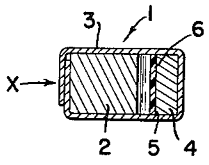
FIG. 4 is a sectional view of the message erasure unit shown in FIG. 3, taken along line 4—4 thereof.

As best shown in FIGS. 3 and 4, the message erasure device or unit 1 of the invention comprises a suitable erasure magnet such as electro-magnet 2 rigidly mounted within a sleeve member 3 and in spaced relation to the electro-magnet 2 is a soft steel pole piece 4. The space 5 between the electro-magnet 2 and pole piece 4 is minutely wider than the thickness of the endless magnetic tape 6 which is threaded through the space so that the tape is snugly received in the space with freedom for sliding movement therethrough. It is also to be understood of course that the free ends of sleeve member 3 are not overlapped and secured to one another at the point X until after the tape 6 has been disposed between magnet 2 and pole piece 4. The erasure unit 1 is connected by suitable leads 7 and 8 to a power supply source 9 in a manner well known in the art.

For a clearer understanding of the operation of the erasure unit 1 a brief description of an endless tape recording and reproducing apparatus, such as that shown in my previous application, will now be given. As indicated particularly in FIGS. 1 and 2, this device generally comprises a box-like receptacle 13 the interior of which is divided into two tape receiving and storage chambers or bins 10 and 11. When used with the device shown in the previous application the erasure unit 1 will be disposed about the endless tape 6 or the portion of the endless tape 6 that is located in tape supply bin 10. This bin is separated from bin 11 by the wall or partition 12 of the receptacle 13. The top 14 of the receptacle 13 contains two tape openings for each bin, such as the openings 15 and 16 for bin 10, and the openings 17 and 18 for bin 11.

The means for moving the endless tape 6 into and out of bins 10 and 11 comprises an electric motor 20 the drive shaft 21 of which is provided with a driving pulley 22 and a driving gear 23. Driving gear 23 is shown in dotted lines in FIG. 1. Driving gear 23 meshes with another driving gear 24, also shown in dotted lines, on the shaft 25 and a driving pulley 25′ is also secured to this same shaft. This latter pulley is connected by endless belt 26 to the large driving pulley 27 mounted on shaft 28. The shaft 28 is mounted at what may be described as the reproducing or transcribing station A by suitable bearing members (not shown) in the top extensions of the side walls 29 and 30 of the receptacle 13. The shaft 28 is also adapted as indicated in FIG. 1 to rotate in a counterclockwise direction.

Figure 1:
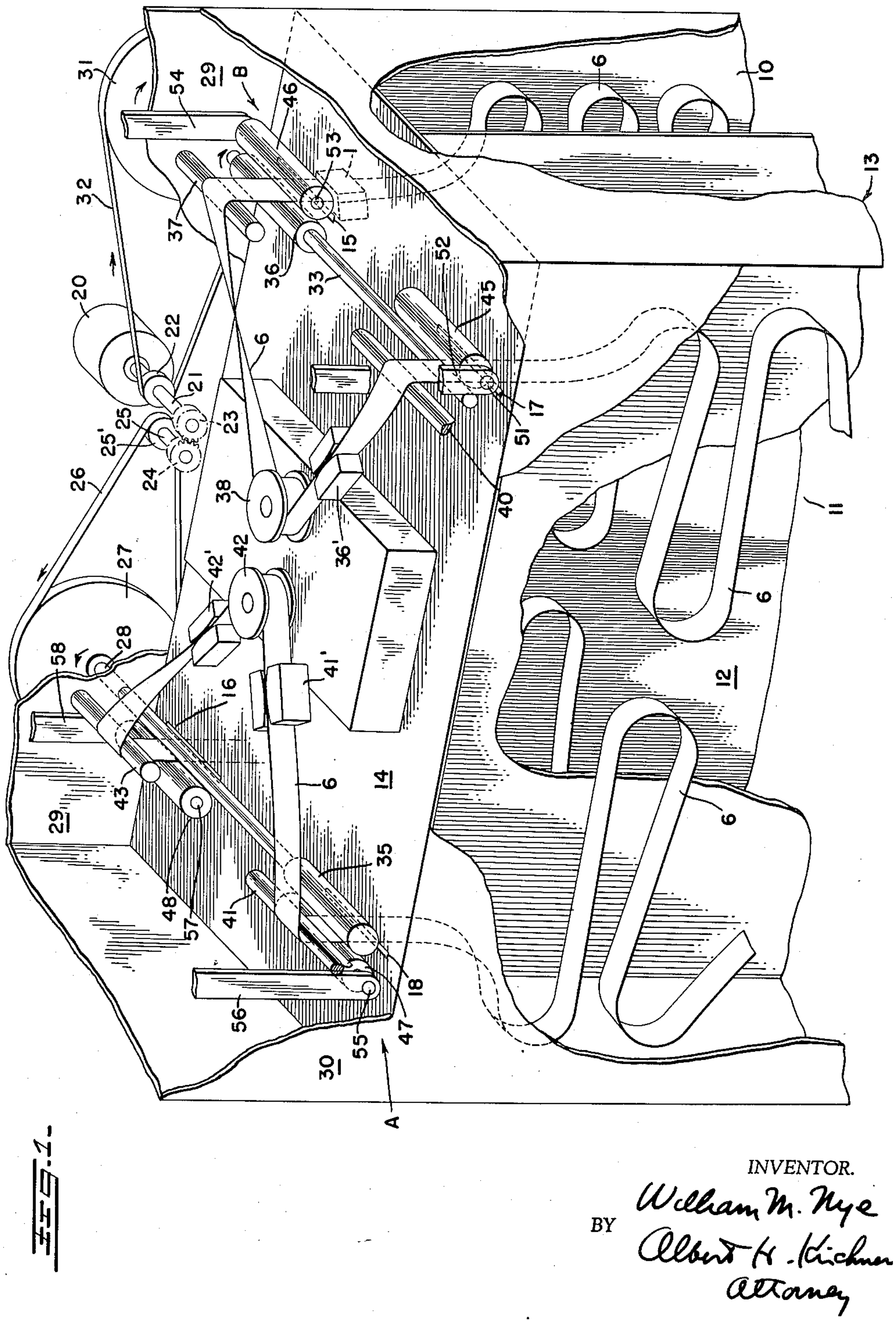
FIGURE 1 is a broken perspective view, with some parts removed and other parts shown in dotted lines, of the message recording and reproducing apparatus shown in application Serial No. 424,330, with the unique message erasure unit of the instant invention incorporated therein.
Figure 2:
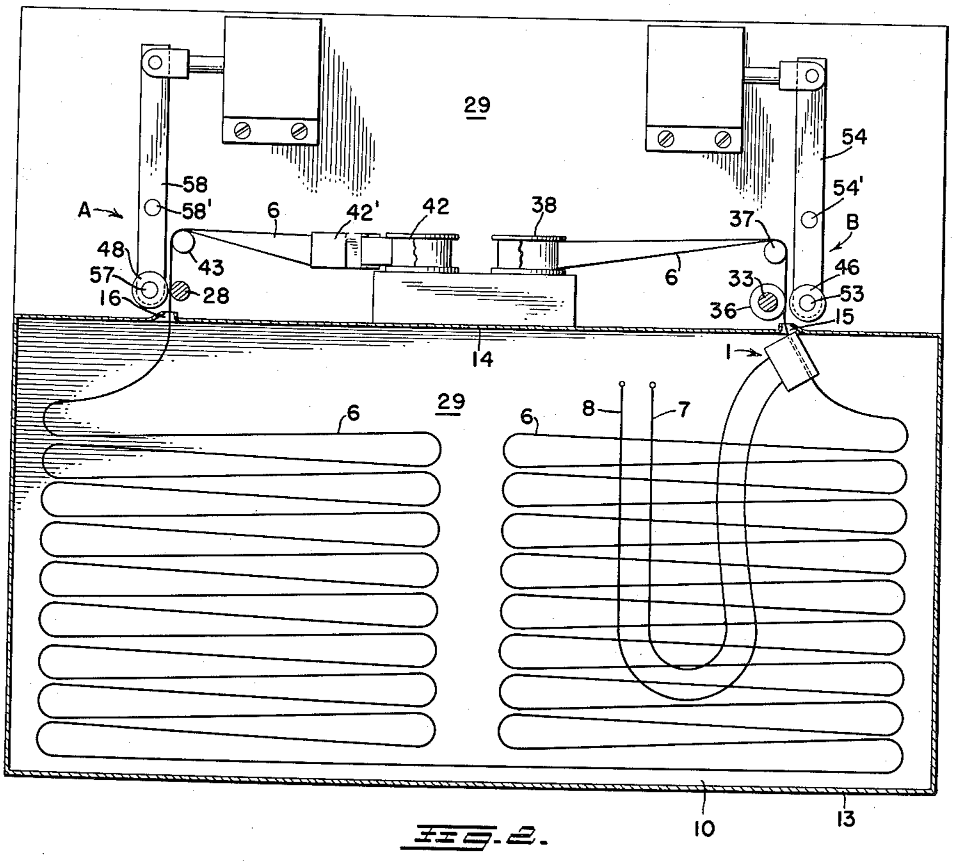
FIG. 2 is a vertical sectional view of the apparatus shown in FIG. 1.

The pulley 22 on motor shaft 21 is connected to the large driving pulley 31 disposed on the right hand side of the receptacle 13 as viewed in FIG. 1 by means of the endless belt 32. Pulley 31 is secured to shaft 33 and shaft 33 is also journaled as in the case of shaft 28 in the top extensions of the side walls 29 and 30 of receptacle 13. Shaft 33 is located at what may be described as the dictating or recording station B. Disposed on shaft 28 adjacent the opening 18 in the top 14 is a sleeve member 35, while disposed on shaft 33 adjacent the opening 15 on the top 14 of receptacle 13 is a similar sleeve member 36.

During use of the apparatus in ordinary dictating, the endless tape 6 is fed up through opening 15 for bin 10, around an idler roller 37 disposed above opening 15 and extending out from the wall 29 through a guide (not shown), around vertically disposed idler roller 38, through guide 36′ across a sound recording head (not shown) over horizontally disposed idler roller 40 journaled in wall 30, and then down past the shaft 33 into the opening 17 in top 14 for bin 11, where the portion of the tape that has been used by the dictator falls in random folds.

From storage bin 11 the tape 6 passes up through opening 18 in the top 14, past the sleeve 35 on shaft 28 and around idler roller 41 journaled in wall 30. The tape then passes through guide 41′, across a sound reproducing head (not shown), around the vertically disposed idler roller 42, through guide 42′, then across the idler roller 43 journaled in the wall above the slotted opening 16 in the top 14, past the shaft 28 and down into the bin 10 through slot 16, where the dictated portion of the tape, which has also been transcribed, then falls in random folds. The used portion of the tape 6 is removed from the bin 10, as and when it is reused by the dictator.

As has been indicated previously in my prior application referred to above, the means for causing the tape 6 to pass back and forth between bins 10 and 11 or to be reversed in its movements between the bins comprises rollers 45, 46, 47 and 48. All of these rollers are mounted on shafts connected to solenoid-operated lever arms. Thus roller 45 is disposed on shaft 51 secured to lever arm 52. Roller 46 is disposed on shaft 53 secured to lever arm 54. Roller 47 is disposed on shaft 55 secured to lever arm 56, and roller 48 is disposed on shaft 57 secured to lever arm 58. All of these arms are of such construction and are so arranged with respect to each other that they may be operated independently of each other.

As also indicated in my previous application, the movements of tape 6 across shaft 33 at the right hand side or dictating station B of the apparatus are primarily controlled by the dictator, while the movements of the tape 6 over the shaft 28 at the transcribing station are controlled primarily by the transcribing operator. By the use of appropriate switches in the electrical control system for the apparatus, the dictator may operate the lever 52 and bring roller 45 into engagement with the endless tape, whereby the tape will then be forced into contact with the shaft 33, which is rotating in a clockwise direction. As the shaft rotates it will cause the endless tape 6 to be drawn up through the opening 15 in bin 10 across the sound recording head (not shown) and then down into the opening 17 in bin 11, where it falls in random folds and remains until it is removed by the transcriber. In order to reverse the tape so that it will pass in a reverse direction across the recording head and across an auxiliary sound reproducing head (also not shown) and back into bin 10, such as when the dictator wants to check his dictation, the dictator actuates lever arm 54, which pivots about pin 54'. Th actuation of lever arm 54 forces the roller 46 into engagement with tape 6, whereupon the tape 6 will be drawn into contact with the sleeve 36 on rotating shaft 33. This will cause the tape to be reversed in its travel and forced back into bin 10 through opening 15. At the same time of course provision is made for lever arm 52 and roller 45 to be moved backaway from the tape.

With respect to the movement of the tape 6 at the left hand side of the apparatus as shown in FIG. 1 or the transcribing station A, the movement of the dictated portion of the tape across a transcribing head (not shown) is accomplished in the following fashion:

The operator actuates the lever arm 58 for the roller 48. As the lever arm pivots about pin 58' it brings roller 48 into engagement with the tape, thereby forcing the tape against the rotating shaft 28. Movement of the shaft 28 in a counterclockwise direction causes the tape to be drawn across the transcribing head referred to above and down into the bin 10, where it falls in random folds. In the event the operator wishes to remove from bin 10 a portion of the tape that has been transcribed and fallen into the bin and to rerun the same, as for the purpose of checking the transcription, lever arm 58 is pivoted in an opposite direction and lever arm 56 is simultaneously operated so as to bring the roller 47 into engagement with the tape. As the roller 47 engages the tape it will force tape 6 against the sleeve 35 on the shaft 28, whereupon the tape will be reversed and drawn down into bin 11 through opening 18 in the top 14 of the receptacle 13. The operator will of course actuate the lever arm 56 only long enough to draw a sufficient amount of transcribed tape back into bin 11. Then, by releasing lever arm 56 and reactuating lever arm 58, movement of the tape across the reproducing or transcribing head will again be effected. Suitable safety devices are also provided to prevent movement of the same portion of the tape in opposite directions to prevent breakage of the tape.

The operation of the erasure unit 1 will now be described as incorporated with a combined dictating and transcribing unit of the foregoing type and similar units.

During the time the dictator is dictating and used tape is passing upwards from storage bin 10 and through opening 15, it is also passing through the slot 5 in the magnetic erasure unit 1 and past the energized electromagnet 2. Thus, prior to the time that the dictator dictates on any predetermined portion of the used tape released from bin or chamber 10, all previous messages thereon will have been erased. If the opening 5 of the erasure unit 1 is only large enough for the tape to pass therethrough under a slight amount of tension, the unit may first become lifted to the position shown in FIG. 1, where it will rest against the bottom surface of top 14 before enough pulling force will be exerted by shaft 33 to cause the tape 6 to be dislodged from unit 1 and pass freely therethrough. This snug fit of the tape 6 in the erasure unit 1 is also used to advantage whenever the dictator wishes to reverse the tape at the dictating station B, so as to replay any part of the tape on which he has previously dictated. When the dictator reverses the tape for play-back purposes, the unit 1 is free to move back with the tape as it is reversed. Thus, when the tape is reversed and allowed to drop back into bin 10, the erasure unit will follow suit, and simply drop back into bin 10 with the tape. The erasure unit 1 will remain at the same point on the tape where it was located immediately prior to the time that the dictator stopped dictating and without erasing any further. The erasure unit will remain in this inactive position until the tape is again reversed so as to flow out of bin 10 and until that portion of the tape where the erasure unit is located begins to move again out of bin 10.

Where the erasure unit is only very loosely held on the tape, gravity will always keep the erasure unit from moving up along with the tape. Accordingly, when the tape is reversed for any reason the erasure unit will simply lie on the bottom of the bin 10 or on top of the portions of the tape located in the bin. In any event, no erasing action of the tape takes place until the tape moves forward and passes through the erasure unit 1.

From the above description it will be readily observed that no portion of the tape can ever reach the dictating station B without first having passed through the erasure unit 1. Moreover no matter how many times the tape is reversed and replayed through the dictating station B, no part of the tape will have passed through the erasure unit 1 more than once.

An advantageous embodiment of the invention has been herein disclosed and described. It will be obvious that various changes and modifications may be made therein without departing from the spirit of the invention and the scope of the appended claims.

I claim:

1. In a sound recording and reproducing device, the combination of a message recording station and a message reproducing station, recording tape storage means disposed intermediate said message recording and message reproducing stations, an endless recording tape disposed in said storage means, means for moving said tape from said message reproducing station through said storage means and to said message recording station, and an erasure unit loosely mounted on the portion of the tape in said storage means, said unit comprising the combination of a magnet and a pole piece disposed in spaced relation to each other on opposite sides of the tape, with the tape loosely and slidably disposed in said space whereby said tape can freely pass through said erasure unit and be automatically erased prior to being fed directly to the recording station.

2. A device as set forth in claim 1, wherein said erasure unit is supported solely by said tape.

3. In a message recording and reproducing system, the combination of a recording medium comprising an endless magnetic tape, a recording station where a message is recorded on said endless tape, a reproducing station where the message recorded on said endless tape is reproduced, tape storage means located immediately adjacent said message recording station for receiving portions of the tape on which messages have been recorded and reproduced, and a message erasure unit loosely mounted on the portion of the tape in said storage means, said unit comprising the combination of a magnet and a pole piece disposed in spaced relation to each other on opposite sides of the tape, with the tape loosely and slidably disposed in said space whereby said tape can freely pass through said erasure unit and be automatically erased prior to being fed directly to the recording station.

4. A system as set forth in claim 3 wherein the message erasure unit is supported solely by said tape.

5. A system as set forth in claim 3 including means for energizing said erasure unit.

6. In a recording and reproducing device of the type described, the combination of a recording medium comprising an endless magnetic tape, a recording station where a message is recorded on said endless tape, a reproducing station where the message recorded on said endless tape is reproduced, tape storage means located immediately adjacent said message recording station for receiving portions of the tape on which messages have been recorded and reproduced, separate tape storage means spaced from said first mentioned storage means and located immediately adjacent said message reproducing station for receiving portions of the tape after messages are recorded thereon, means for withdrawing portions of the tape located in said first mentioned storage means and for feeding said portions of the tape to said message recording station, and an erasure unit loosely mounted on the portion of the tape in said first mentioned storage means, said unit comprising the combination of a magnet and a pole piece disposed in spaced relation to each other on opposite sides of the tape, with the tape loosely and slidably disposed in said space whereby said tape can freely pass through said erasure unit and be automatically erased prior to being fed directly to the recording station and erasure of the tape will be halted whenever movement of the tape to the recording station is stopped.

7. A device as set forth in claim 6 wherein said erasure unit includes an electro-magnet.

References Cited in the file of this patent

UNITED STATES PATENTS

| | | |
|---|---|---|
| 2,288,862 | Weitmann et al. | July 7, 1942 |
| 2,428,002 | Barrett | Sept. 30, 1947 |
| 2,428,449 | Camras | Oct. 7, 1947 |
| 2,499,700 | Tinkham et al. | Mar. 7, 1950 |
| 2,594,934 | Kornei | Apr. 29, 1952 |
| 2,719,884 | Reed et al. | Oct. 4, 1955 |
| 2,738,384 | Starnecki | Mar. 13, 1956 |
| 2,917,250 | Bodenstein | Dec. 15, 1959 |

FOREIGN PATENTS

| | | |
|---|---|---|
| 585,258 | Germany | Sept. 30, 1933 |
| 688,567 | Great Britain | Mar. 11, 1953 |